Oct. 28, 1952 G. E. MAYBACH 2,615,337
BATTERY LIQUID LEVEL INDICATOR
Filed May 6, 1948
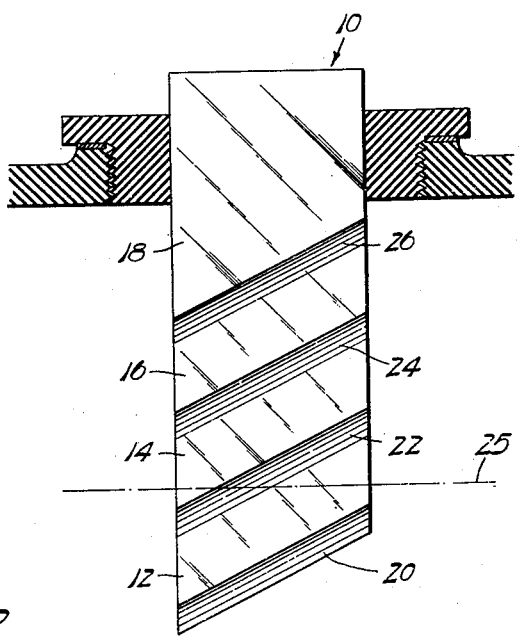
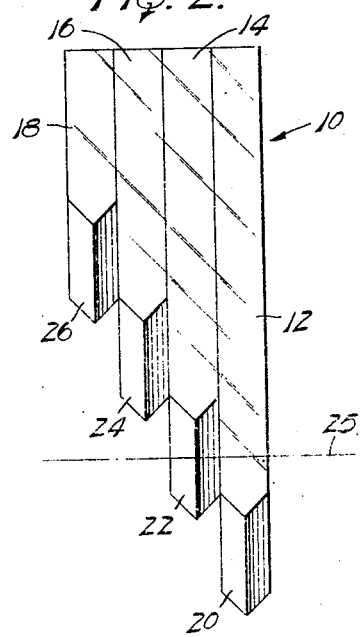
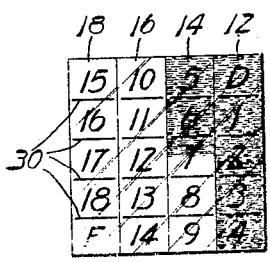
INVENTOR
GERALD E. MAYBACH
BY
Bean, Brooks, Buckley & Bean
ATTORNEYS Patented Oct. 28, 1952

2,615,337

UNITED STATES PATENT OFFICE 2,615,337

BATTERY LIQUID LEVEL INDICATOR

Gerald E. Maybach, Bowmansville, N. Y., assignor to National Battery Company, St. Paul, Minn.

Application May 6, 1948, Serial No. 25,458

8 Claims. (Cl. 73—327)

This invention relates to liquid level reading devices such as are useful in storage batteries or the like, for indicating the level of the liquid therein. More particularly, the present invention relates to an improved multiple level reading device of the character aforesaid such as is useful for example in connection with heavy duty industrial storage batteries wherein close readings of the liquid level must be taken periodically to insure proper operation and maintenance of the battery.

One of the objects of the invention is to provide an improved image type liquid level indicator which will progressively indicate liquid level fluctuations throughout a range including the permissible low and high levels of the liquid.

Another object of the invention is to provide an improved device of the character aforesaid which is of structurally simple and inexpensive manufacture form.

Other objects and advantages of the invention will appear in the specification hereinafter.

In the drawing:

Fig. 1 is a fragmentary vertical sectional view through a storage battery cover plate, showing in side elevation a liquid level indicator mounted thereon;

Fig. 2 is an end elevation of the indicator device of Fig. 1; and

Fig. 3 is a top plan thereof, illustrating the type of liquid level indication provided by the device.

The invention relates generally to the type of device referred to in my previously filed application Serial Number 15,674, March 18, 1948, wherein is disclosed an indicator for giving multiple stage readings. However, in the case of the present invention continuous imagery of the liquid level is provided throughout all stages of fluctuations thereof.

In the drawing, the invention is illustrated for example to comprise a device generally designated 10 which is in the form of a light transmitting member which comprises a plurality of laminar form elements 12, 14, 16, 18. These elements may be fabricated individually of glass or clear plastic or the like cemented together at adjacent side surfaces so as to provide the device in the form of a single unit for convenience in handling. The elements 12, 14, 16, 18 are flatted at their upper ends and relatively disposed so as to be flush, while their lower ends are angularly cut off as viewed in Fig. 1 and 45° beveled symmetrically of their center lines as viewed in Fig. 2. Thus, each of the laminar elements terminates at its lower end in a 90° ridged land such as designated in the drawing at 20, 22, 24, 26, respectively; each land being inclined relative to the long axis of the unit so that the upper end portion of each land coincides with the elevation of the lower end portion of the inclined land of the next adjacent shorter element.

As is known in the art, whenever a light transmitting member having a 45° beveled lower end portion is mounted to extend into the dark interior of a battery case or the like, any light entering the upper end of the device and travelling downwardly therethrough will be absorbed into the cell liquid if the lower end of the device is in wetted contact with the liquid. On the other hand, if the lower end of the device is free from contact with the liquid, then the incoming light will be reflected against the beveled bottom edge portion of the device and will be thereby returned to reappear at the upper end of the device, thereby acting to illuminate the upper end of the light transmitter to give it a "bright" look as distinguished from a "black" look which covers the upper end of the device whenever the lower end thereof is in contact with the liquid in the cell.

Thus, in the case of the present invention, it will be appreciated that if only the longest one of the laminar elements is in liquid contact at its lower end, only the top end of that element will appear to be dark; and that furthermore if only a portion of one of the elements is in liquid contact, only the corresponding upper end portion thereof will appear to be "blackened." Thus, the upper end faces of the laminar elements may be graduated, such as by lines 30 (Fig. 3); and liquid level indicia in the form of successively arranged numerals may be conveniently scribed upon the upper face of the device so that alternate brightening and blackening of successive indicia spaces will provide correct indications of the positions of the level of the liquid interiorly of the battery. For example, the upper end indicia portion corresponding to the lowermost tip end portion of the long laminar element 12 may be scribed with the letter D so that whenever that portion of the reading surface becomes brightened the letter D will become prominently displayed so as to indicate that the battery liquid has assumed a dangerously low level. Then, as liquid is added to the battery the level indicating areas marked by numerals will become progressively blackened, so that when the liquid level rises for example as to the elevation indicated at 25 in Figs. 1–2, the corresponding submerged indicia spaces will be blackened, as is indicated in Fig. 3. Further filling of the battery will continue the progressive blackening of the level image areas, until finally the terminal area marked F will become blackened thereby indicating that the battery is full of liquid.

Thus, it will be appreciated that the present invention provides in a single dimensionally compact unit improved means capable of indicating the minutest fluctuations of liquid level, providing at any time an accurate liquid level reading. Thus, the device of the invention enables the battery attendant to keep a closer check upon the level of the battery liquid with increased facility.

I claim:

1. A liquid level indicator adapted to be mounted to extend into the interior of a darkened cell containing liquid subject to level fluctuations, said indicator comprising a plurality of light transmitting members elongated in the direction of extent into the cell and in one direction transversely thereof, said elements being formed at their lower ends with reflective faceted surfaces extending in the direction of said transverse extension and inclined therealong from the horizontal.

2. A liquid level indicator adapted to be mounted to extend into the interior of a darkened cell containing liquid subject to level fluctuations, said indicator comprising a laminate light transmitting member including a plurality of light transmitting laminae each of which is formed at its lower end with an elongate beveled edge longitudinally inclined relative to the direction of extent of said member into the cell.

3. A liquid level indicator adapted to be mounted to extend into the interior of a cell containing liquid subject to level fluctuations, said indicator comprising a light transmitting member formed at its lower end with a plurality of elongate reflective surfaces longitudinally inclined relative to the direction of extent of said member into the cell.

4. A liquid level indicator mounted to extend through a wall portion of and into the interior of a cell containing liquid subject to level fluctuations, said indicator comprising a light transmitting member formed at its lower end with a plurality of elongate parallel ridges longitudinally inclined relative to the direction of extent of said member into the cell.

5. A liquid level indicator adapted to be mounted to extend through a wall of a darkened cell containing liquid subject to level fluctuations and into the interior thereof for variable degree contact with the liquid as its level fluctuates, said indicator comprising a light transmitting member formed at its lower end with a plurality of 45° ridges at successive positions of progressively greater extent into the cell for continuous level indication over a range of levels embracing all of said ridges, each of said ridges being elongate and longitudinally inclined relative to the direction of extent of said member into the said cell.

6. A liquid level indicator adapted to be mounted to extend into the interior of a darkened cell containing liquid subject to level fluctuations, said indicator comprising a laminate light transmitting member including a plurality of light transmitting laminae of different lengths which are positioned coextensively at their outer ends and are formed at their inner ends with elongate beveled edges longitudinally inclined relative to the direction of extent of said member into the cell.

7. A liquid level indicator adapted to be mounted to extend into the interior of a cell containing liquid subject to level fluctuations, said indicator comprising a light transmitting member formed with a flat outer end and at its inner end with a plurality of elongate beveled edges at different distances from said outer end and each vertically inclined in the direction of its elongation, said distances being such as to provide continuously successive employment of said edges at the surface of said liquid as the level of said liquid fluctuates within the limits of said indicator.

8. A liquid level indicator mounted to extend from a flat outer end portion thereof through a wall portion of and into the interior of a cell containing liquid subject to level fluctuations, said indicator comprising a light transmitting member formed at a position inwardly of said cell with a plurality of parallel elongate ridges disposed at different distances from said outer end and each vertically inclined in the direction of its elongation.

GERALD E. MAYBACH.

REFERENCES CITED

The following references are of record in the file of this patent:

UNITED STATES PATENTS

| Number | Name | Date |
|---|---|---|
| 461,370 | Seidensticker | Oct. 13, 1891 |
| 1,724,716 | Kryzanowsky | Aug. 13, 1929 |
| 2,123,479 | Spencer | July 12, 1938 |
| 2,301,460 | Sauer | Nov. 10, 1942 |
| 2,368,705 | DuPont et al. | Feb. 6, 1945 |

FOREIGN PATENTS

| Number | Country | Date |
|---|---|---|
| 412,803 | Great Britain | July 5, 1935 |